United States Patent [19]

Kindig et al.

[11] 4,205,979

[45] Jun. 3, 1980

[54] PROCESS FOR BENEFICIATING OXIDE ORES

[75] Inventors: James K. Kindig, Arvada; Ronald L. Turner, Golden, both of Colo.

[73] Assignee: Hazen Research, Inc., Golden, Colo.

[21] Appl. No.: 950,176

[22] Filed: Oct. 10, 1978

[51] Int. Cl.$^2$ .............................................. C22B 1/06
[52] U.S. Cl. .................................... 75/1 R; 75/21; 209/214; 427/252
[58] Field of Search ................. 75/1 R, 1 T, 21, 28, 75/62, 72, 77, 82, 81, 111, 112; 423/23, 13 P, 25; 204/217, 213, 214; 427/47, 252, 253, 254, 255

[56] References Cited

U.S. PATENT DOCUMENTS

| | | | |
|---|---|---|---|
| 1,053,486 | 2/1913 | Etherington | 75/1 R |
| 1,789,813 | 1/1931 | Grams | 75/1 T |
| 2,132,404 | 10/1938 | Dean et al. | 423/25 |
| 2,332,309 | 10/1943 | Drummond | 427/252 |
| 2,612,440 | 9/1952 | Altmann | 75/0.5 |
| 2,944,883 | 7/1960 | Queneau et al. | 75/0.5 |
| 3,220,875 | 11/1965 | Queneau | 427/217 |
| 3,252,791 | 5/1966 | Frysinger et al. | 75/119 |
| 3,323,903 | 6/1967 | O'Neill et al. | 75/0.5 |
| 3,466,167 | 9/1969 | Illis et al. | 75/112 |
| 3,490,899 | 1/1970 | Knisky et al. | 423/25 |
| 3,669,644 | 6/1972 | Sato | 423/25 |
| 3,938,966 | 2/1976 | Kindig et al. | 44/1 R |
| 3,977,862 | 8/1976 | Glasser | 75/1 T |
| 4,056,386 | 11/1977 | McEwan et al. | 423/417 |
| 4,098,584 | 7/1978 | Kindig et al. | 44/1 R |

FOREIGN PATENT DOCUMENTS

| | | | |
|---|---|---|---|
| 179095 | 7/1954 | Austria | 75/112 |
| 119156 | 8/1959 | U.S.S.R. | 209/212 |

*Primary Examiner*—L. Dewayne Rutledge
*Assistant Examiner*—Michael L. Lewis
*Attorney, Agent, or Firm*—Sheridan, Ross, Fields & McIntosh

[57] ABSTRACT

In a process for beneficiating one or more mineral values of a metal oxide ore selected from the group consisting of bauxite, taconite, chrysocolla, apatite, titanium oxides and the metal oxides of Groups IIIB, IVB, VB, VIB, VIIB, VIIIB, IB, IIB and IVA by treating the ore with a metal containing compound, preferably iron carbonyl, under conditions such as to selectively enhance the magnetic susceptibility of the mineral values to the exclusion of the gangue in order to permit a separation between the values and gangue, the improvement comprising pretreating the metal oxide ore by heating it to a temperature of at least about 80° C. for a time period of at least about 0.1 hours.

41 Claims, No Drawings

PROCESS FOR BENEFICIATING OXIDE ORES

BACKGROUND OF THE INVENTION

1. Field of the Invention

This invention is an improvement on a means for treating ores to separate the mineral values from gangue material by selectively enhancing the magnetic susceptibility of the mineral values so that they may be magnetically removed from the gangue.

2. Description of the Prior Art

As is well known, mining operations in the past for recovering various metals (e.g., lead and copper) have utilized high grade ore deposits where possible. Many of these deposits have been exhausted and mining of lower grade ores is increasing. The processing of these leaner ores consumes large amounts of time, labor, reagents, power and water with conventional processing.

In addition to the increased expense associated with the extraction of these metals from low grade ores, proposed processes for separation of certain of the sulfide ores are technically very difficult and involve elaborate and expensive equipment. In many cases the expense incurred by such separation would be greater than the commercial value of the metal, such that the mineral recovery, while theoretically possible, is economically unfeasible.

Our copending patent application Ser. No. 921,583 filed July 3, 1978 entitled "Process For Beneficiating Oxide Ores" teaches the treatment of oxide ores with a metal containing compound under conditions such as to selectively enhance the magnetic susceptibility of the mineral values to the exclusion of the gangue, allowing for a separation of these values from the gangue. However, it appears as though the presence of various volatile compounds within the ore can have an adverse effect on the recovery of mineral values in a process which enhances the magnetic susceptibility of the mineral values. Pretreating the raw oxide ore with heat in order to volatilize these various components, and thereafter selectively enhancing the magnetic susceptibility of the mineral values so that they may be physically separated from the gangue, substantially enhances the effectiveness of the separation of the mineral values from the gangue. Additionally, pretreatment with heat, optionally in the presence of various gaseous additives, enhances the basic process, apparently as a result of differing mechanisms.

SUMMARY OF THE INVENTION

The process of the present invention entails heat pretreatment of a metal oxide ore selected from the group consisting of bauxite, taconite, chrysocolla, apatite, titanium oxides and the metal oxides of Groups IIIB, IVB, VB, VIB, VIIB, VIIIB, IB, IIB, and IVA, and thereafter treating the metal oxide ore with a metal containing compound, preferably iron carbonyl, under conditions such that the magnetic susceptibility of the ore is selectively enhanced to the exclusion of the gangue. The affected or values may then be separated from the gangue, preferably by means of a magnetic separation.

The pretreatment is conducted at a temperature of at least about 80° C. for a time period of at least about 0.1 hours. The heat pretreatment step may also be conducted in the presence of one or more gaseous additives, for example, steam, nitrogen, hydrogen, carbon monoxide, hydrogen sulfide, ammonia, and sulfur dioxide.

DESCRIPTION OF THE PREFERRED EMBODIMENTS

The process of the present invention is particularly useful for concentrating metal oxide minerals. The process employs the heat pretreatment of the metal oxide ore with heat or heat in conjunction with a gaseous additive, and thereafter treating the ore with a metal containing compound, preferably iron carbonyl, under conditions such as to selectively enhance the magnetic susceptibility of various mineral values contained within the ore. The treated mixture can then be subjected to a separation process to produce a beneficiated product.

The heat pretreatment of the present invention is conducted prior to initiating the reaction with the metal containing compound. This pretreatment essentially comprises heating the metal oxide ore in order to render the ore more receptive to the magnetic enhancement reaction. The temperature and time of heating are interrelated, and essentially higher temperatures require less time. The particular time and temperature for the pretreatment process will depend on the particular ore being beneficiated and also the metal containing compound with which the ore is later treated. Since metal oxide ores as a group do not readily decompose with heat, the pretreatment may occur over a broad range of temperatures. The temperature must not exceed the decomposition temperature of the mineral value, or a temperature above which substantial vaporizaton would occur. It is generally preferred that the pretreatment essentially comprise heating the ore to a temperature of at least about 80° C., more preferably from about 125° C. to about 500° C. and most preferably to a temperature of from about 175° C. to about 250° C. It is preferred that this heat pretreatment be done for a time period of at least about 0.1, more preferably from about 0.20 to 4 hours, and most preferably from about 0.25 to about 1 hour.

The heat pretreatment need not be immediately followed by the magnetic enhancement reaction. Hence, the ore may be permitted to cool to ambient temperature, or any other convenient temperature, prior to conducting the magnetic susceptibility enhancement reaction. However, if the heat pretreatment is conducted at a temperature greater than the temperature of the magnetic enhancement reaction, the ore must be cooled to at least the temperature at which the magnetic enhancement reaction will be conducted.

It is generally preferred to maintain the heat pretreatment temperature at least slightly above the temperature of the magnetic enhancement reaction. This is not an imperative requirement, however, improved results are generally accomplished. The pretreating by heating the ore is believed to change the ore either physically or chemically and/or be volatilize various components which can interfere with the magnetic enhancement reaction. Therefore, if the magnetic enhancement reaction is conducted at a temperature in excess of the pretreatment temperature, it is possible that additional volatile components could somewhat detrimentally affect the magnetic enhancement reaction.

The heat pretreatment step may be conducted in the presence of one or more gaseous additives, and this is preferable under many circumstances. Examples of suitable gaseous additives include steam, nitrogen, hydrogen, carbon monoxide, carbon dioxide, ammonia, hydrogen sulfide, sulfur dioxide, methane, air, ethane, propane, butane and other hyrocarbon compounds in the gaseous state at the pretreatment temperature. Preferred gaseous additives include steam, nitrogen, hydrogen, carbon monoxide, hydrogen sulfide, ammonia and sulfur dioxide.

When these additives are employed it is preferable that they be employed in an amount of at least about 2, more preferably at least about 12, and most preferably at least about 120 cubic meters per hour per metric ton of ore being processed.

A particular preferred additive is steam. Heat pretreatment with steam is preferably conducted at a temperature of at least about 100° C., more preferably from about 150° C. to about 350° C., and most preferably from about 175° C. to about 250° C. Preferably, the pretreatment should be conducted for at least about 0.1 hours, more preferably for at least about 0.25 hours, and most preferably for at least 0.5 hours. The amount of water preferably ranges from about 1% to about 50%, more preferably from about 5% to about 30%, and most preferably from about 10% to about 25%, based on the weight of the metal oxide ore being treated.

After the ore has been subjected to this heat pretreatment, it is then treated with a metal containing compound in order to selectively enhance the magnetic susceptibility of its various mineral values.

"Enhancing the magnetic susceptibility" of the ore as used herein is intended to be defined in accordance with the following discussion. Every compound of any type has a specifically defined magnetic susceptibility, which refers to the overall attraction of the compound to a magnetic force. An alteration of the surface magnetic characteristics will alter the magnetic susceptibility. The metal containing compound treatment of the process alters the surfacr characterisics of the ore particles in order to enhance the magnetic susceptibility of the particles. It is to be understood that the magnetic susceptibility of the compound is not actually changed, but the particle itself is changed, at least at its surface, resulting in a particle possessing a greater magnetic susceptibility than the original particle. For convenience of discussion, this alternation is termed herein as "enhancing the magnetic susceptibility" of the particle or ore itself.

The metal oxide minerals which are capable of undergoing a selective magnetic enhancement in accordance with the process include the metal oxides of Groups IIIB, IVB, VB, VIB, VIIB, VIIIB, IB, IIB and IVA, the titanium oxides of Group IVB, aluminum hydrate, i.e. bauxite, of Group IIIB, taconite, chrysocolla, and apatite. It is recognized that taconite and chrysocollar are classified as silicates and apatite is classified as a phosphate, and it is further recognized that apatite does not contain elements generally classified as metals (other than calcium). However, for the purposes of this inventive process they are classified as metal oxides. The preferred oxide minerals include bauxite, apatite, cuprite, cassiterite, carnotite, scheelite, chrysocolla and hematite.

The gangue minerals from which the metal oxide ores can be separated include those minerals which do not undergo a sufficient magnetic susceptibility enhancement as a result of the process. These gangue minerals include, for example, silica, alumina, gypsum, muscovite, dolomite, calcite, albite and feldspars, as well as various other minerals.

In those ores which contain naturally relatively strongly magnetic constituents, such as magnetite, the magnetic material may first be removed by passing the mixture through a magnetic separator. The nonmagnetic portion obtained by this precleaning step is then subjected to the heat pretreatment and then treatment with a metal containing compound. Prior to either of the treatments, the ore must be ground to liberate the metal oxide particles from the gangue particles, if the respective components do not already exist in this liberated state. The ore may be crushed finer than necessary to achieve liberation, but this is not generally economically possible. It is generally satisfactory to crush the ore to minus 14 mesh, although many ores require grinding to minus 65 mesh or finer.

Numerous metal containing compounds are capable of enhancing the magnetic susceptibility of these metal oxides in accordance with the invention. Many iron containing compounds possess the capability of enhancing the magnetic susceptibility of the mineral values of the ore, as long as the compound is adaptable so as to bring the iron in the compound into contact with the mineral value under conditions such as to cause an alteration of at least a portion of the surface of the mineral value.

Iron containing compounds capable of exerting sufficient vapor pressure, with iron as a component in the vapor, so as to bring the iron into contact with the value at the reaction temperature are suitable, as well as other organic and inorganic iron containing compounds which can be dissolved and/or "dusted" and brought into contact with the mineral value contained within the ore. Preferred compounds within the vapor pressure group are those which exert a vapor pressure, with iron as a component in the vapor, of at least about 10 millimeters of mercury, more preferably of at least about 25 millimeters of mercury and most preferably of at least about 50 millimeters of mercury at the reaction temperature. Examples of groupings which fall within this vapor pressure definition include ferrocene and its derivatives and beta-diketone compounds of iron. Specific examples include ferrocene and iron acetylacetonate.

Other organic compounds which may be utilized to enhance the magnetic susceptibility include those which may be homogeneously mixed with a carrier liquid and brought into contact with the components of the ore. Such mixtures include, for example, solutions, suspensions and emulsions. These compounds must be such as to provide sufficient metal to contact the surface of the mineral value. Suitable carrier liquids include, for example, acetone, petroleum ether, naptha, hexane, benzene and water; but this, of course, is dependent upon the particular metal compound being employed. Specific groupings include, for example, ferrocene and its derivatives and the carboxylic acid salts of iron, such as, iron octoate, iron naphthenate, iron stearate and ferric acetylacetonate.

Additionally, solid organic iron containing compounds capable of being directly mixed with the ore in solid form possess the capability of enhancing the magnetic susceptibility of the metal sulfides. The compound must be in solid form at the mixing temperature and be of sufficiently fine particle size in order to be able to be well dispersed throughout the ore. The particle size is preferably smaller than about 20 mesh, more preferably smaller than about 100 mesh, and most preferably smaller than about 400 mesh. Compounds within this grouping include ferrocene and its derivatives, iron salts of organic acids, and beta-diketone compounds of iron. Specific examples include ferrous formate, 1,1'-diacetylferrocene, and 1,1'-dihydroxymethyl ferrocene.

Various inorganic compounds are also capable of producing an enhanced magnetic susceptibility. Preferred inorganic compounds include ferrous chloride, ferric chloride and the metal carbonyls, including, for example, iron, nickel, cobalt, molybdenum, tungsten and chromium carbonyls and derivatives of these compounds. Iron carbonyl is a preferred carbonyl for imparting this magnetic susceptibility, particularly iron pentacarbonyl, iron dodecacarbonyl and iron nonacarbonyl. The more preferred metal containing compounds capable of enhancing the magnetic susceptibility are iron pentacarbonyl, ferrocene, ferric acetylacetonate, ferrous chloride and ferric chloride, with iron pentacarbonyl being the most preferred.

The process is applied by contacting the iron containing compound with the ore at a temperature wherein the iron containing compound selectively decomposes or otherwise reacts at the surface of metal oxide particles to alter their surface characteristics, while remaining essentially unreactive, or much less reactive, at the surface of the gangue particles. The temperature of the reaction is a critical parameter, and dependent primarily upon the particular compound and the particular ore. The preferred temperature can be determined by heating a sample of the specific iron containing compound and the specific ore together until the decomposition reaction occurs. Suitable results generally occur over a given temperature range for each system. Generally, temperatures above the range cause non-selective decomposition while temperatures below the range are insufficient for the reaction to occur.

While as indicated above, techniques other than vapor injection methods may be employed as applicable depending upon the metal containing compound being utilized, the following discussion primarily applies to vapor injection techniques, specifically iron pentacarbonyl, as these are generally preferred. Similar considerations, as can be appreciated, apply to the other described techniques.

The preferred temperatures when iron pentacarbonyl is employed as the treating gas are primarily dependent upon the ore being treated. It is generally preferred to select a temperature which is within a range of 125° C., more preferably 50° C., and most preferably 15° C. less than the general decomposition temperature of the iron carbonyl in the specific system. The general decomposition temperature is intended to mean the temperature at which the iron carbonyl decomposes into iron and carbon monoxide in an indiscriminate fashion, causing a magnetic enhancement of the gangue as well as the metal oxide. The "specific system" is intended to include all components and parameters, other than, of course, temperature, of the precise treatment, as the general decomposition temperature generally varies with different components and/or different parameters. This decomposition temperature range can be readily determined by analytical methods, and often a trial and error approach is preferred to determine the precise temperature range for each specific system.

The amount of the metal containing compound used and the time of treatment can be varied to maximize the selective enhancement treatment. With respect to iron carbonyl the preferred amount employed is from about 0.1 to about 100 kilograms per metric ton of feed, more preferably from about 1 to about 50 kilograms per metric ton of feed, and most preferably from about 2 to 20 kilograms per metric ton of feed. The reaction is generally conducted for a period of time from about 0.05 to about 4 hours, more preferably from about 0.15 to about 2 hours, and most preferably from about 0.25 to 1 hour.

The process of this invention is not especially useful in beneficiating oxide ores which are highly naturally magnetic since such ores can be beneficiated by subjecting them to a magnetic separation process or first heating them before the magnetic process. An example of such an ore is pyrolusite.

After the feed mixture containing the metal oxide values has been pretreated with heat and treated with a metal containing compound, it can then be subjected to a physical separation process to effect the separation of the treated metal oxides from the gangue. Any of many commercially available magnetic separators can be used to remove these values from the gangue. For example, low or medium intensity separations can be made with a permanent magnetic drum separator, electromagnetic drum separators, induced roll separators or other configurations known to those skilled in the art. Since most oxides are liberated at a mesh size of 65 mesh or finer, a wet magnetic separation process is more effective. Thus, high intensity, high gradient wet magnetic separators are preferred. Also, electrostatic techniques may be employed as the primary separation means, or in addition to the magnetic separation means. The selective change in surface characteristics changes the electrical conductivity of the particle in analogous fashion to changing the particle's magnetic characteristics. Additionally, due to the fact that the oxide surface characteristics have been selectively altered, the oxides are often more amenable to processes such as flotation and chemical leaching.

EXAMPLE 1

Samples of different minerals were ground to a minus 65 mesh and mixed with minus 65 mesh silica sand to produce 3% synthetic ores with the exception of carnotite which was a 5% ore. Each sample was pretreated with steam by rapidly heating the sample to 200° C. under a nitrogen purge; thereafter the sample was treated for 15 minutes with 200 kilograms of steam per metric ton of sample. The reactor was then cooled under a nitrogen purge. Following this steam pretreatment each sample was treated with 8 kilograms of iron pentacarbonyl per metric ton of sample for 30 minutes at the temperature indicated in Table 1. All of the samples were then subjected to a magnetic separation process. The results are given in Table 1.

TABLE 1

| Mineral | Temperature Of Fe(CO)$_5$ Treatment (°C.) | Product | Weight (%) | Grade (%) | Metal | Metal Distribution |
|---|---|---|---|---|---|---|
| Carnotite | 145 | Magnetic | 24.0 | 0.059 | U$_3$O$_8$ | 70.0 |
|  |  | Nonmagnetic | 76.0 | 0.008 | U$_3$O$_8$ | 30.0 |
|  |  | Calculated Feed | 100.0 | 0.020 | U$_3$O$_8$ | 100.0 |
| Apatite | 125 | Magnetic | 1.6 | 8.14 | P | 36.0 |

TABLE 1-continued

| Mineral | Temperature Of Fe(CO)$_5$ Treatment (°C.) | Product | Weight (%) | Grade (%) | Metal | Metal Distribution |
|---|---|---|---|---|---|---|
|  |  | Nonmagnetic | 98.4 | 0.235 | P | 64.0 |
|  |  | Calculated Feed | 100.0 | 0.36 | P | 100.0 |
| Scheelite | 135 | Magnetic | 1.55 | 6.01 | W | 23.4 |
|  |  | Nonmagnetic | 98.45 | 0.31 | W | 76.6 |
|  |  | Calculated Feed | 100.0 | 0.40 | W | 100.0 |
| Cuprite | 125 | Magnetic | 1.9 | 45.1 | Cu | 71.8 |
|  |  | Nonmagnetic | 98.1 | 0.344 | Cu | 28.2 |
|  |  | Calculated Feed | 100.0 | 1.19 | Cu | 100.0 |
| Cassiterite | 128 | Magnetic | 14.5 | 2.06 | Sn | 23.5 |
|  |  | Nonmagnetic | 85.5 | 1.14 | Sn | 76.5 |
|  |  | Calculated Feed | 100.0 | 1.27 | Sn | 100.0 |

EXAMPLE 2

For comparison, additional samples of the same type of ores of Example 1 were subjected to just a steam pretreatment, and then magnetically separated. Analyses of these comparative blanks are given in Table 2.

TABLE 2

| Mineral | Product | Weight (%) | Grade (%) | Metal | Metal Distribution |
|---|---|---|---|---|---|
| Carnotite | Magnetic | 0.71 | 0.321 | $U_3O_8$ | 12.6 |
|  | Nonmagnetic | 99.29 | 0.016 | $U_3O_8$ | 87.4 |
|  | Calculated Feed | 100.0 | 0.018 | $U_3O_8$ | 100.0 |
| Apatite | Magnetic | 0.48 | 0.518 | P | 0.62 |
|  | Nonmagnetic | 99.52 | 0.399 | P | 99.38 |
|  | Calculated Feed | 100.0 | 0.40 | P | 100.00 |
| Scheelite | Magnetic | 1.25 | 1.00 | W | 3.1 |
|  | Nonmagnetic | 98.75 | 0.40 | W | 96.9 |
|  | Calculated Feed | 100.0 | 0.41 | W | 100.0 |
| Cuprite | Magnetic | 1.04 | 42.3 | Cu | 37.9 |
|  | Nonmagnetic | 98.96 | 0.728 | Cu | 62.1 |
|  | Calculated Feed | 100.0 | 1.16 | Cu | 100.0 |
| Cassiterite | Magnetic | 0.97 | 24.0 | Sn | 19.5 |
|  | Nonmagnetic | 99.03 | 0.97 | Sn | 80.5 |
|  | Calculated Feed | 100.0 | 1.19 | Sn | 100.0 |

EXAMPLE 3

Samples of different synthetic ores were prepared as indicated in Example 1. Each of the samples in this example was pretreated with heat and nitrogen by rapidly heating a reactor containing the sample to 400° C. during a nitrogen purge which flowed at a rate such that one reactor volume of gas was introduced into the system every 4.3 minutes and maintaining these conditions for 15 minutes. Then the reactor was cooled under a nitrogen purge. Following this pretreatment each sample was treated with 8 kilograms of iron pentacarbonyl per metric ton of sample for 30 minutes at the temperature indicated in Table 3. All of the samples were then subjected to a wet magnetic separation process. The results are presented in Table 3.

TABLE 3

| Mineral | Temperature of Fe(CO)$_5$ Treatment (°C.) | Product | Weight (%) | Grade (%) | Metal | Metal Distribution |
|---|---|---|---|---|---|---|
| Carnotite | 145 | Magnetic | 62.5 | 0.047 | $U_3O_8$ | 90.7 |
|  |  | Nonmagnetic | 37.5 | 0.008 | $U_3O_8$ | 9.3 |
|  |  | Calculated Feed | 100.0 | 0.032 | $U_3O_8$ | 100.0 |
| Apatite | 125 | Magnetic | 1.9 | 7.96 | P | 39.7 |
|  |  | Nonmagnetic | 98.1 | 0.234 | P | 60.3 |
|  |  | Calculated Feed | 100.0 | 0.38 | P | 100.0 |
| Scheelite | 135 | Magnetic | 4.4 | 4.42 | W | 51.7 |
|  |  | Nonmagnetic | 95.6 | 0.19 | W | 48.3 |
|  |  | Calculated Feed | 100.0 | 0.38 | W | 100.0 |
| Cuprite | 125 | Magnetic | 2.9 | 32.6 | Cu | 75.3 |
|  |  | Nonmagnetic | 97.1 | 0.32 | Cu | 24.7 |
|  |  | Calculated Feed | 100.0 | 1.26 | Cu | 100.0 |

EXAMPLE 4

For comparative purposes, additional samples of the same type of ores of Example 3 were subjected to just the heat and nitrogen pretreatment, and then magnetically separated. Analyses of these comparative blanks are given in Table 4.

Table 4

| Mineral | Product | Weight (%) | Grade (%) | Metal | Metal Distribution |
|---|---|---|---|---|---|
| Carnotite | Magnetic | 1.1 | 0.421 | $U_3O_8$ | 20.6 |
|  | Nonmagnetic | 98.9 | 0.018 | $U_3O_8$ | 79.4 |
|  | Calculated Feed | 100.0 | 0.022 | $U_3O_8$ | 100.0 |
| Apatite | Magnetic | 0.94 | 0.683 | P | 1.8 |
|  | Nonmagnetic | 99.06 | 0.358 | P | 98.2 |
|  | Calculated Feed | 100.0 | 0.36 | P | 100.0 |
| Scheelite | Magnetic | 1.4 | 0.82 | W | 2.8 |
|  | Nonmagnetic | 98.6 | 0.40 | W | 97.2 |
|  | Calculated Feed | 100.0 | 0.41 | W | 100.0 |
| Cuprite | Magnetic | 0.76 | 34.1 | Cu | 26.6 |
|  | Nonmagnetic | 99.24 | 0.72 | Cu | 73.4 |
|  | Calculated Feed | 100.0 | 0.97 | Cu | 100.0 |

EXAMPLE 5

Samples of different synthetic ores were prepared as indicated in Example 1. Each of the samples in this example was pretreated with heat and hydrogen by rapidly heating the reactor containing the sample to 400° C. while purging it with nitrogen. This temperature was maintained for 15 minutes while hydrogen gas was passed through the reactor at a flow rate of one reactor volume of gas every 4.3 minutes. The reactor was cooled under a purge of nitrogen gas. Each sample was then treated with 8 kilograms of iron pentacarbonyl per metric ton of sample for 30 minutes at the temperature indicated in Table 5. Thereafter the samples were subjected to a wet magnetic separation process. The results are given in Table 5.

minutes at the temperature indicated in Table 7. The samples were then subjected to a wet magnetic separation process. The results are presented in Table 7.

TABLE 7

| Mineral | Temperature of Fe(CO)$_5$ Treatment (°C.) | Product | Weight (%) | Grade (%) | Metal | Metal Distribution |
|---|---|---|---|---|---|---|
| Carnotite | 145 | Magnetic | 54.7 | 0.051 | U$_3$O$_8$ | 93.9 |
|  |  | Nonmagnetic | 45.3 | 0.004 | U$_3$O$_8$ | 6.1 |
|  |  | Calculated Feed | 100.0 | 0.030 | U$_3$O$_8$ | 100.0 |
| Scheelite | 135 | Magnetic | 5.0 | 4.20 | W | 53.8 |
|  |  | Nonmagnetic | 95.0 | 0.19 | W | 46.2 |
|  |  | Calculated Feed | 100.0 | 0.39 | W | 100.0 |
| Cuprite | 125 | Magnetic | 4.8 | 23.4 | Cu | 87.4 |
|  |  | Nonmagnetic | 95.2 | 0.17 | Cu | 12.6 |
|  |  | Calculated Feed | 100.0 | 1.29 | Cu | 100.0 |

TABLE 5

| Mineral | Temperature of Fe(CO)$_5$ Treatment (°C.) | Product | Weight (%) | Grade (%) | Metal | Metal Distribution |
|---|---|---|---|---|---|---|
| Carnotite | 145 | Magnetic | 63.7 | 0.057 | U$_3$O$_8$ | 96.2 |
|  |  | Nonmagnetic | 36.3 | 0.004 | U$_3$O$_8$ | 3.8 |
|  |  | Calculated Feed | 100.0 | 0.038 | U$_3$O$_8$ | 100.0 |
| Apatite | 125 | Magnetic | 3.3 | 5.75 | P | 57.0 |
|  |  | Nonmagnetic | 96.7 | 0.148 | P | 43.0 |
|  |  | Calculated Feed | 100.0 | 0.33 | P | 100.0 |
| Cuprite | 125 | Magnetic | 3.1 | 31.2 | Cu | 81.4 |
|  |  | Nonmagnetic | 96.9 | 0.228 | Cu | 18.6 |
|  |  | Calculated Feed | 100.0 | 1.19 | Cu | 100.0 |

EXAMPLE 6

For comparative purposes, additional samples of the same type of ores of Example 5 were subjected to just the heat and hydrogen pretreatment, and then magnetically separated. Analyses of these comparative blanks are given in Table 6.

TABLE 6

| Mineral | Product | Weight (%) | Grade (%) | Metal | Metal Distribution |
|---|---|---|---|---|---|
| Carnotite | Magnetic | 10.1 | 0.209 | U$_3$O$_8$ | 85.4 |
|  | Nonmagnetic | 89.9 | 0.004 | U$_3$O$_8$ | 14.6 |
|  | Calculated Feed | 100.0 | 0.025 | U$_3$O$_8$ | 100.0 |
| Apatite | Magnetic | 2.2 | 2.91 | P | 16.5 |
|  | Nonmagnetic | 97.8 | 0.332 | P | 83.5 |
|  | Calculated Feed | 100.0 | 0.39 | P | 100.0 |
| Cuprite | Magnetic | 0.73 | 44.1 | Cu | 34.3 |
|  | Nonmagnetic | 99.27 | 0.622 | Cu | 65.7 |
|  | Calculated Feed | 100.0 | 0.94 | Cu | 100.0 |

EXAMPLE 7

Samples of different synthetic ores were prepared as indicated in Example 1. Each of the samples in this example was pretreated with heat and carbon monoxide by rapidly heating the reactor containing the sample to 400° C. while purging it with nitrogen. This temperature was maintained for 15 minutes while carbon monoxide gas was passed through the reactor at a flow rate of one reactor volume of gas every 4.3 minutes. The reactor was cooled under a purge of nitrogen gas. Thereafter each sample was treated with 8 kilograms of iron pentacarbonyl per metric ton of sample for 30

EXAMPLE 8

For comparative purposes, additional samples of the same type of ores of Example 7 were subjected to just the heat and carbon monoxide pretreatment, and then magnetically separated. Analyses of these comparative blanks are given in Table 8.

TABLE 8

| Mineral | Product | Weight (%) | Grade (%) | Metal | Metal Distribution |
|---|---|---|---|---|---|
| Carnotite | Magnetic | 8.4 | 0.248 | U$_3$O$_8$ | 85.0 |
|  | Nonmagnetic | 91.6 | 0.004 | U$_3$O$_8$ | 15.0 |
|  | Calculated Feed | 100.0 | 0.024 | U$_3$O$_8$ | 100.0 |
| Scheelite | Magnetic | 2.4 | 0.85 | W | 5.0 |
|  | Nonmagnetic | 97.6 | 0.40 | W | 95.0 |
|  | Calculated Feed | 100.0 | 0.41 | W | 100.0 |
| Cuprite | Magnetic | 0.95 | 34.3 | Cu | 26.7 |
|  | Nonmagnetic | 99.05 | 0.904 | Cu | 73.3 |
|  | Calculated Feed | 100.0 | 1.22 | Cu | 100.0 |

EXAMPLE 9

For comparative purposes, samples of the same type of ores used in the preceding examples were not given any pretreatment but were just treated with 8 kilograms of iron pentacarbonyl per metric ton of feed for 30 minutes at the same temperature as used in the preceding examples. These samples were then magnetically separated. Additionally, another series of samples of ores were treated merely to the temperature of the iron carbonyl treatment and given no iron carbonyl treatment; these were also subjected to a magnetic separation process. Analyses of these comparative results are given below in Table 9.

TABLE 9

| Mineral | Dosage of Fe(CO)$_5$ (Kg./m$^3$ ton) | Product | Weight (%) | Grade (%) | Metal | Metal Distribution |
|---|---|---|---|---|---|---|
| Carnotite | 8 | Magnetic | 1.4 | 0.731 | U$_3$O$_8$ | 35.3 |
| | | Nonmagnetic | 98.6 | 0.019 | U$_3$O$_8$ | 64.7 |
| | | Calculated Feed | 100.0 | 0.029 | U$_3$O$_8$ | 100.0 |
| Carnotite | 0 | Magnetic | 0.67 | 0.297 | U$_3$O$_8$ | 6.7 |
| | | Nonmagnetic | 99.33 | 0.028 | U$_3$O$_8$ | 93.3 |
| | | Calculated Feed | 100.0 | 0.030 | U$_3$O$_8$ | 100.0 |
| Apatite | 8 | Magnetic | 4.9 | 4.0 | P | 39.9 |
| | | Nonmagnetic | 95.1 | 0.31 | P | 60.1 |
| | | Calculated Feed | 100.0 | 0.491 | P | 100.0 |
| Apatite | 0 | Magnetic | 0.41 | 0.34 | P | 0.4 |
| | | Nonmagnetic | 99.59 | 0.36 | P | 99.6 |
| | | Calculated Feed | 100.0 | 0.36 | P | 100.0 |
| Scheelite | 8 | Magnetic | 27.4 | 2.85 | W | 58.6 |
| | | Nonmagnetic | 72.6 | 0.76 | W | 41.4 |
| | | Calculated Feed | 100.0 | 1.33 | W | 100.0 |
| Scheelite | 0 | Magnetic | 2.1 | 2.44 | W | 4.0 |
| | | Nonmagnetic | 97.9 | 1.23 | W | 96.0 |
| | | Calculated Feed | 100.0 | 1.25 | W | 100.0 |
| Cuprite | 8 | Magnetic | 2.1 | 0.165 | Cu | 47.3 |
| | | Nonmagnetic | 97.9 | 0.004 | Cu | 52.7 |
| | | Calculated Feed | 100.0 | 0.0074 | Cu | 100.0 |
| Cuprite | 0 | Magnetic | 0.54 | 0.417 | Cu | 31.5 |
| | | Nonmagnetic | 99.46 | 0.005 | Cu | 68.5 |
| | | Calculated Feed | 100.0 | 0.0073 | Cu | 100.0 |
| Bauxite | 8 | Magnetic | 3.3 | 20.1 | Al | 97.9 |
| | | Nonmagnetic | 96.7 | 0.014 | Al | 2.1 |
| | | Calculated Feed | 100.0 | 0.677 | Al | 100.0 |
| Bauxite | 0 | Magnetic | 0.81 | 17.0 | Al | 18.7 |
| | | Nonmagnetic | 99.19 | 0.605 | Al | 81.3 |
| | | Calculated Feed | 100.0 | 0.738 | Al | 100.0 |
| Hematite | 8 | Magnetic | 1.14 | 36.2 | Fe | 33.9 |
| | | Nonmagnetic | 98.86 | 0.81 | Fe | 66.1 |
| | | Calculated Feed | 100.0 | 1.21 | Fe | 100.0 |
| Hematite | 0 | Magnetic | 0.10 | 22.9 | Fe | 3.1 |
| | | Nonmagnetic | 99.90 | 0.73 | Fe | 96.9 |
| | | Calculated Feed | 100.0 | 0.75 | Fe | 100.0 |
| Cassiterite | 8 | Magnetic | 3.5 | 4.83 | Sn | 14.9 |
| | | Nonmagnetic | 96.5 | 0.998 | Sn | 85.1 |
| | | Calculated Feed | 100.0 | 1.13 | Sn | 100.0 |
| Cassiterite | 0 | Magnetic | 0.65 | 23.6 | Sn | 10.8 |
| | | Nonmagnetic | 99.35 | 1.25 | Sn | 89.2 |
| | | Calculated Feed | 100.0 | 1.39 | Sn | 100.0 |

EXAMPLE 10

Samples of apatite and bauxite were made into 3% synthetic ores as indicated in Example 1. Each of these samples was subjected to a pretreatment and thereafter treated with 16 kilograms of ferrocene per metric ton of sample. The ferrocene were mixed with the sample, and the temperature of the reactor was slowly raised to 400° C. over a two hour period. The system was purged with nitrogen prior to and following the ferrocene treatment. Finally, the samples were subjected to a wet magnetic separation process. Each of the pretreatments, i.e., steam, heat plus nitrogen, heat plus hydrogen and heat plus carbon monoxide, were conducted in the same manner as the pretreatment in Examples 1, 3, 5, and 7, respectively.

For comparative purposes, additional samples of the same type of ores were subjected to just the pretreatment followed by wet magnetic separation. Also, samples of these ores were given no pretreatment and were subjected to only the ferrocene treatment with subsequent magnetic separation. Analyses of these comparative samples are given in Table 10.

TABLE 10

| Mineral | Pretreatment | Product | Weight (%) | Grade (%) | Metal | Metal Distribution |
|---|---|---|---|---|---|---|
| Apatite | Steam | Magnetic | 0.91 | 3.33 | P | 5.7 |
| | | Nonmagnetic | 99.09 | 0.502 | P | 94.3 |
| | | Calculated Feed | 100.0 | 0.53 | P | 100.0 |
| Apatite | Steam blank | Magnetic | 0.37 | 1.16 | P | 0.8 |
| | | Nonmagnetic | 99.63 | 0.53 | P | 99.2 |
| | | Calculated Feed | 100.0 | 0.53 | P | 100.0 |
| Apatite | Heat & N$_2$ | Magnetic | 0.96 | 3.99 | P | 7.2 |
| | | Nonmagnetic | 99.04 | 0.50 | P | 92.8 |
| | | Calculated Feed | 100.0 | 0.53 | P | 100.0 |
| Apatite | Heat & N$_2$ blank | Magnetic | 0.60 | 1.64 | P | 1.8 |
| | | Nonmagnetic | 99.40 | 0.53 | P | 98.2 |
| | | Calculated Feed | 100.0 | 0.54 | P | 100.0 |
| Apatite | Heat & H$_2$ | Magnetic | 1.7 | 4.71 | P | 15.0 |
| | | Nonmagnetic | 98.3 | 0.46 | P | 85.0 |
| | | Calculated Feed | 100.0 | 0.53 | P | 100.0 |
| Apatite | Heat & H$_2$ blank | Magnetic | 1.3 | 4.81 | P | 11.9 |

TABLE 10-continued

| Mineral | Pretreatment | Product | Weight (%) | Grade (%) | Metal | Metal Distribution |
|---|---|---|---|---|---|---|
| | | Nonmagnetic | 98.7 | 0.47 | P | 88.1 |
| | | Calculated Feed | 100.0 | 0.53 | P | 100.0 |
| Apatite | Heat & CO | Magnetic | 1.1 | 5.71 | P | 12.4 |
| | | Nonmagnetic | 98.9 | 0.45 | P | 87.6 |
| | | Calculated Feed | 100.0 | 0.51 | P | 100.0 |
| Apatite | Heat & CO blank | Magnetic | 0.77 | 6.40 | P | 9.2 |
| | | Nonmagnetic | 99.23 | 0.49 | P | 90.8 |
| | | Calculated Feed | 100.0 | 0.54 | P | 100.0 |
| Apatite | None (Ferrocene treatment @ 400° C.) | Magnetic | 5.1 | 2.1 | P | 26.1 |
| | | Nonmagnetic | 94.9 | 0.32 | P | 73.9 |
| | | Calculated Feed | 100.0 | 0.41 | P | 100.0 |
| Apatite | None (Heat to 400° C. and no Ferrocene) | Magnetic | 0.54 | 1.22 | P | 1.6 |
| | | Nonmagnetic | 99.46 | 0.43 | P | 98.4 |
| | | Calculated Feed | 100.0 | 0.435 | P | 100.0 |
| Bauxite | Steam | Magnetic | 2.8 | 23.1 | Al | 94.3 |
| | | Nonmagnetic | 97.2 | 0.04 | Al | 5.7 |
| | | Calculated Feed | 100.0 | 0.69 | Al | 100.0 |
| Bauxite | Steam blank | Magnetic | 1.33 | 1.71 | Al | 3.8 |
| | | Nonmagnetic | 98.67 | 0.59 | Al | 96.2 |
| | | Calculated Feed | 100.0 | 0.61 | Al | 100.0 |
| Bauxite | Heat & $N_2$ | Magnetic | 3.4 | 21.0 | Al | 77.9 |
| | | Nonmagnetic | 96.6 | 0.21 | Al | 22.1 |
| | | Calculated Feed | 100.0 | 0.92 | Al | 100.0 |
| Bauxite | Heat & $N_2$ blank | Magnetic | 2.0 | 25.6 | Al | 61.3 |
| | | Nonmagnetic | 98.0 | 0.33 | Al | 38.7 |
| | | Calculated Feed | 100.0 | 0.84 | Al | 100.0 |
| Bauxite | Heat & $H_2$ | Magnetic | 4.1 | 18.8 | Al | 86.1 |
| | | Nonmagnetic | 95.9 | 0.13 | Al | 13.9 |
| | | Calculated Feed | 100.0 | 0.90 | Al | 100.0 |
| Bauxite | Heat & $H_2$ blank | Magnetic | 3.3 | 17.6 | Al | 77.9 |
| | | Nonmagnetic | 96.7 | 0.17 | Al | 22.1 |
| | | Calculated Feed | 100.0 | 0.75 | Al | 100.0 |
| Bauxite | Heat & CO | Magnetic | 1.8 | 17.3 | Al | 66.5 |
| | | Nonmagnetic | 98.2 | 0.16 | Al | 33.5 |
| | | Calculated Feed | 100.0 | 0.47 | Al | 100.0 |
| Bauxite | Heat & CO blank | Magnetic | 3.0 | 23.4 | Al | 75.1 |
| | | Nonmagnetic | 97.0 | 0.24 | Al | 24.9 |
| | | Calculated Feed | 100.0 | 0.93 | Al | 100.0 |
| Bauxite | None (Ferrocene treatment @ 400° C.) | Magnetic | 3.4 | 14.3 | Al | 86.3 |
| | | Nonmagnetic | 96.6 | 0.08 | Al | 13.7 |
| | | Calculated Feed | 100.0 | 0.563 | Al | 100.0 |
| Bauxite | None (Heated to 400° C. and no ferrocene) | Magnetic | 2.4 | 17.7 | Al | 64.5 |
| | | Nonmagnetic | 97.6 | 0.24 | Al | 35.5 |
| | | Calculated Feed | 100.0 | 0.659 | Al | 100.0 |

EXAMPLE 11

Samples of different synthetic ores were prepared as indicated in Example 1. Each of these samples were subjected to a pretreatment and thereafter treated with 16 kilograms of vaporized ferric acetylacetonate per metric ton of sample at a temperature of 270° C. for a period of 30 minutes. The samples were then subjected to a magnetic separation process. Each of the pretreatments indicated in Table 11 were conducted in the same manner as described in Example 1, 3, 5 or 7.

For comparative purposes, samples of the same type of ores were subjected to just the pretreatment followed by magnetic separation (these results are designated as blanks in Table 11). Additional samples of these ores were given no pretreatment and were subjected to only the ferric acetylacetonate treatment with subsequent magnetic separation. Analyses of these comparative samples are given below in Table 11.

TABLE 11

| Mineral | Pretreatment | Product | Weight (%) | Grade (%) | Metal | Metal Distribution |
|---|---|---|---|---|---|---|
| Carnotite | Steam | Magnetic | 4.1 | 0.089 | $U_3O_8$ | 48.8 |
| | | Nonmagnetic | 95.9 | 0.004 | $U_3O_8$ | 51.2 |
| | | Calculated Feed | 100.0 | 0.007 | $U_3O_8$ | 100.0 |
| Carnotite | Steam blank | Magnetic | 0.52 | 0.092 | $U_3O_8$ | 3.1 |
| | | Nonmagnetic | 99.48 | 0.015 | $U_3O_8$ | 96.9 |
| | | Calculated Feed | 100.0 | 0.015 | $U_3O_8$ | 100.0 |
| Carnotite | Heat & $H_2$ | Magnetic | 4.1 | 0.122 | $U_3O_8$ | 63.5 |
| | | Nonmagnetic | 95.9 | 0.003 | $U_3O_8$ | 36.5 |
| | | Calculated Feed | 100.0 | 0.008 | $U_3O_8$ | 100.0 |
| Carnotite | Heat & $H_2$ blank | Magnetic | 6.7 | 0.106 | $U_3O_8$ | 60.4 |
| | | Nonmagnetic | 93.3 | 0.005 | $U_3O_8$ | 39.6 |
| | | Calculated Feed | 100.0 | 0.012 | $U_3O_8$ | 100.0 |
| Carnotite | Heat & CO | Magnetic | 7.7 | 0.093 | $U_3O_8$ | 79.5 |

TABLE 11-continued

| Mineral | Pretreatment | Product | Weight (%) | Grade (%) | Metal | Metal Distribution |
|---|---|---|---|---|---|---|
| | | Nonmagnetic | 92.3 | 0.002 | $U_3O_8$ | 20.5 |
| | | Calculated Feed | 100.0 | 0.009 | $U_3O_8$ | 100.0 |
| Carnotite | Heat & CO blank | Magnetic | 5.1 | 0.115 | $U_3O_8$ | 46.9 |
| | | Nonmagnetic | 94.9 | 0.007 | $U_3O_8$ | 53.1 |
| | | Calculated Feed | 100.0 | 0.013 | $U_3O_8$ | 100.0 |
| Carnotite | None (acetylacetonate at 270° C.) | Magnetic | 1.2 | 0.418 | $U_3O_8$ | 25.6 |
| | | Nonmagnetic | 98.8 | 0.015 | $U_3O_8$ | 74.4 |
| | | Calculated Feed | 100.0 | 0.020 | $U_3O_8$ | 100.0 |
| Carnotite | None (heated to 270° C.) | Magnetic | 0.97 | 0.514 | $U_3O_8$ | 21.9 |
| | | Nonmagnetic | 99.03 | 0.018 | $U_3O_8$ | 78.1 |
| | | Calculated Feed | 100.0 | 0.023 | $U_3O_8$ | 100.0 |
| Apatite | Heat & $H_2$ | Magnetic | 3.2 | 2.15 | P | 13.0 |
| | | Nonmagnetic | 96.8 | 0.475 | P | 87.0 |
| | | Calculated Feed | 100.0 | 0.53 | P | 100.0 |
| Apatite | Heat & $H_2$ blank | Magnetic | 1.3 | 4.81 | P | 11.9 |
| | | Nonmagnetic | 98.7 | 0.47 | P | 88.1 |
| | | Calculated Feed | 100.0 | 0.53 | P | 100.0 |
| Apatite | Heat & CO | Magnetic | 3.0 | 2.20 | P | 12.8 |
| | | Nonmagnetic | 97.0 | 0.464 | P | 87.2 |
| | | Calculated Feed | 100.0 | 0.52 | P | 100.0 |
| Apatite | Heat & CO blank | Magnetic | 0.77 | 6.40 | P | 9.2 |
| | | Nonmagnetic | 99.23 | 0.49 | P | 90.8 |
| | | Calculated Feed | 100.0 | 0.54 | P | 100.0 |
| Apatite | None (acetylacetonate at 270° C.) | Magnetic | 2.3 | 0.96 | P | 5.8 |
| | | Nonmagnetic | 97.7 | 0.37 | P | 94.2 |
| | | Calculated Feed | 100.0 | 0.384 | P | 100.0 |
| Apatite | None (heated to 270° C.) | Magnetic | 0.34 | 0.637 | P | 0.5 |
| | | Nonmagnetic | 99.66 | 0.427 | P | 99.5 |
| | | Calculated Feed | 100.0 | 0.428 | P | 100.0 |
| Hematite | Steam | Magnetic | 0.62 | 29.8 | Fe | 20.1 |
| | | Nonmagnetic | 99.38 | 0.739 | Fe | 79.9 |
| | | Calculated Feed | 100.0 | 0.92 | Fe | 100.0 |
| Hematite | Steam blank | Magnetic | 0.06 | 17.6 | Fe | 1.0 |
| | | Nonmagnetic | 99.94 | 1.03 | Fe | 99.0 |
| | | Calculated Feed | 100.0 | 1.04 | Fe | 100.0 |
| Hematite | Heat & $N_2$ | Magnetic | 0.70 | 26.0 | Fe | 19.6 |
| | | Nonmagnetic | 99.30 | 0.75 | Fe | 80.4 |
| | | Calculated Feed | 100.0 | 0.93 | Fe | 100.0 |
| Hematite | Heat & $N_2$ blank | Magnetic | 0.05 | 23.4 | Fe | 1.1 |
| | | Nonmagnetic | 99.95 | 1.05 | Fe | 98.9 |
| | | Calculated Feed | 100.0 | 1.06 | Fe | 100.0 |
| Hematite | Heat & $H_2$ | Magnetic | 4.6 | 8.88 | Fe | 67.1 |
| | | Nonmagnetic | 95.4 | 0.21 | Fe | 32.9 |
| | | Calculated Feed | 100.0 | 0.61 | Fe | 100.0 |
| Hematite | Heat & $H_2$ blank | Magnetic | 6.8 | 6.85 | Fe | 74.6 |
| | | Nonmagnetic | 93.2 | 0.17 | Fe | 25.4 |
| | | Calculated Feed | 100.0 | 0.62 | Fe | 100.0 |
| Hematite | None (acetylacetonate at 270° C.) | Magnetic | 0.63 | 24.1 | Fe | 16.9 |
| | | Nonmagnetic | 99.37 | 0.75 | Fe | 83.1 |
| | | Calculated Feed | 100.0 | 0.90 | Fe | 100.0 |
| Hematite | None (heated to 270° C.) | Magnetic | 0.39 | 5.96 | Fe | 2.4 |
| | | Nonmagnetic | 99.61 | 0.94 | Fe | 97.6 |
| | | Calculated Feed | 100.0 | 0.96 | Fe | 100.0 |
| Bauxite | Steam | Magnetic | 4.3 | 13.3 | Al | 81.0 |
| | | Nonmagnetic | 95.7 | 0.14 | Al | 19.0 |
| | | Calculated Feed | 100.0 | 0.71 | Al | 100.0 |
| Bauxite | Steam blank | Magnetic | 1.16 | 11.1 | Al | 18.3 |
| | | Nonmagnetic | 98.84 | 0.58 | Al | 81.7 |
| | | Calculated Feed | 100.0 | 0.70 | Al | 100.0 |
| Bauxite | Heat & $N_2$ | Magnetic | 2.5 | 20.8 | Al | 80.4 |
| | | Nonmagnetic | 97.5 | 0.13 | Al | 19.6 |
| | | Calculated Feed | 100.0 | 0.65 | Al | 100.0 |
| Bauxite | Heat & $N_2$ blank | Magnetic | 1.88 | 17.9 | Al | 50.2 |
| | | Nonmagnetic | 98.12 | 0.34 | Al | 49.8 |
| | | Calculated Feed | 100.0 | 0.67 | Al | 100.0 |
| Bauxite | None (acetylacetonate at 270° C.) | Magnetic | 2.4 | 18.9 | Al | 70.0 |
| | | Nonmagnetic | 97.6 | 0.20 | Al | 30.0 |
| | | Calculated Feed | 100.0 | 0.649 | Al | 100.0 |
| Bauxite | None (heated to 270° C.) | Magnetic | 1.6 | 24.4 | Al | 48.0 |
| | | Nonmagnetic | 98.4 | 0.43 | Al | 52.0 |
| | | Calculated Feed | 100.0 | 0.814 | Al | 100.0 |
| Scheelite | Steam | Magnetic | 4.4 | 1.07 | W | 10.1 |
| | | Nonmagnetic | 95.6 | 0.44 | W | 89.9 |
| | | Calculated Feed | 100.0 | 0.47 | W | 100.0 |
| Scheelite | Steam blank | Magnetic | 1.2 | 1.29 | W | 3.1 |
| | | Nonmagnetic | 98.2 | 0.49 | W | 96.9 |
| | | Calculated Feed | 100.0 | 0.50 | W | 100.0 |
| Scheelite | Heat & CO | Magnetic | 4.5 | 0.936 | W | 8.6 |
| | | Nonmagnetic | 95.5 | 0.466 | W | 91.4 |
| | | Calculated Feed | 100.0 | 0.49 | W | 100.0 |

TABLE 11-continued

| Mineral | Pretreatment | Product | Weight (%) | Grade (%) | Metal | Metal Distribution |
|---|---|---|---|---|---|---|
| Scheelite | Heat & CO blank | Magnetic | 1.9 | 1.55 | W | 5.9 |
| | | Nonmagnetic | 98.1 | 0.48 | W | 94.1 |
| | | Calculated Feed | 100.0 | 0.50 | W | 100.0 |
| Scheelite | Heat & N$_2$ | Magnetic | 3.8 | 1.25 | W | 9.8 |
| | | Nonmagnetic | 96.2 | 0.454 | W | 90.2 |
| | | Calculated Feed | 100.0 | 0.48 | W | 100.0 |
| Scheelite | Heat & N$_2$ blank | Magnetic | 1.8 | 1.16 | W | 4.2 |
| | | Nonmagnetic | 98.2 | 0.49 | W | 95.8 |
| | | Calculated Feed | 100.0 | 0.50 | W | 100.0 |
| Scheelite | None (acetylacetonate at 270° C.) | Magnetic | 3.1 | 0.96 | W | 7.7 |
| | | Nonmagnetic | 96.9 | 0.37 | W | 92.3 |
| | | Calculated Feed | 100.0 | 0.39 | W | 100.0 |
| Scheelite | None (heated to 270° C.) | Magnetic | 1.3 | 1.09 | W | 3.3 |
| | | Nonmagnetic | 98.7 | 0.42 | W | 96.7 |
| | | Calculated Feed | 100.0 | 0.43 | W | 100.0 |

EXAMPLE 12

Samples of carnotite and cuprite synthetic ores were prepared as indicated in Example 1. A sample of each of these ores was pretreated with heat and hydrogen sulfide gas by rapidly heating the reactor containing the sample to 200° C. while purging it with nitrogen. This temperature was maintained for 15 minutes while hydrogen sulfide gas was passed through the reactor at a flow rate of one reactor volume of gas being introduced into the system every 4.3 minutes. The reactor was cooled under a purge of nitrogen gas. Each sample was then treated with 8 kilograms of iron pentacarbonyl per metric ton of sample for 30 minutes at a temperature of 145° C. in the case of carnotite and at a temperature of 125° C. in the case of cuprite ore. For comparative purposes, an additional sample of each of these ores received merely the pretreatment in the manner indicated above. All of the samples were subjected to a wet magnetic separation process. Analyses of the products thus obtained are presented below in Table 12.

TABLE 12

| Mineral | Fe(CO)$_5$ Treatment | Product | Weight (%) | Grade (%) | Metal | Metal Distribution |
|---|---|---|---|---|---|---|
| Carnotite | Yes | Magnetic | 43.8 | 0.024 | U$_3$O$_8$ | 94.9 |
| | | Nonmagnetic | 56.2 | 0.001 | U$_3$O$_8$ | 5.1 |
| | | Calculated Feed | 100.0 | 0.011 | U$_3$O$_8$ | 100.0 |
| Carnotite | No | Magnetic | 0.86 | 0.187 | U$_3$O$_8$ | 16.9 |
| | | Nonmagnetic | 99.14 | 0.008 | U$_3$O$_8$ | 83.1 |
| | | Calculated Feed | 100.0 | 0.010 | U$_3$O$_8$ | 100.0 |
| Cuprite | Yes | Magnetic | 10.3 | 5.08 | Cu | 39.6 |
| | | Nonmagnetic | 89.7 | 0.89 | Cu | 60.4 |
| | | Calculated Feed | 100.0 | 1.32 | Cu | 100.0 |
| Cuprite | No | Magnetic | 0.77 | 12.1 | Cu | 19.0 |
| | | Nonmagnetic | 99.23 | 0.40 | Cu | 81.0 |
| | | Calculated Feed | 100.0 | 0.49 | Cu | 100.0 |

EXAMPLE 13

Samples of carnotite and cuprite synthetic ores were prepared as indicated in Example 1. A sample of each of these ores was pretreated with heat and sulfur dioxide gas by rapidly heating the reactor containing the sample to 400° C. while purging it with nitrogen. This temperature was maintained for 15 minutes while sulfur dioxide gas was passed through the reactor at a flow rate of one reactor volume of gas being introduced every 4.3 minutes. the reactor was cooled under a purge of nitrogen gas. Each sample was then treated with 8 kilograms of iron pentacarbonyl per metric ton of sample for 30 minutes at a temperature of 145° C. in the case of the carnotite ore and a temperature of 125° C. in the case of the cuprite ore. For comparative purposes, an additional sample of each of these ores was subjected only to the pretreatment in the manner indicated above. All of the samples were subjected to a wet magnetic separation process and the analyses of the products thus obtained are given below in Table 13.

TABLE 13

| Mineral | Fe(CO)$_5$ Treatment | Product | Weight (%) | Grade (%) | Metal | Metal Distribution |
|---|---|---|---|---|---|---|
| Carnotite | Yes | Magnetic | 59.2 | 0.019 | U$_3$O$_8$ | 82.1 |
| | | Nonmagnetic | 40.8 | 0.006 | U$_3$O$_8$ | 17.9 |
| | | Calculated Feed | 100.0 | 0.014 | U$_3$O$_8$ | 100.0 |
| Carnotite | No | Magnetic | 0.99 | 0.161 | U$_3$O$_8$ | 10.3 |
| | | Nonmagnetic | 99.01 | 0.014 | U$_3$O$_8$ | 89.7 |
| | | Calculated Feed | 100.0 | 0.015 | U$_3$O$_8$ | 100.0 |
| Cuprite | Yes | Magnetic | 32.8 | 1.21 | Cu | 47.2 |
| | | Nonmagnetic | 67.2 | 0.66 | Cu | 52.8 |
| | | Calculated Feed | 100.0 | 0.84 | Cu | 100.0 |
| Cuprite | No | Magnetic | 0.33 | 9.35 | Cu | 3.9 |
| | | Nonmagnetic | 99.67 | 0.77 | Cu | 96.1 |
| | | Calculated Feed | 100.0 | 0.80 | Cu | 100.0 |

EXAMPLE 14

Samples of carnotite and cuprite synthetic ores were prepared as indicated in Example 1. A sample of each of these ores was pretreated with heat and ammonia by rapidly heating the reactor containing the sample to 400° C. while purging it with nitrogen. This temperature was maintained for 15 minutes while ammonia gas was passed through the reactor at a flow rate of one reactor volume of gas being introduced every 4.3 minutes. The reactor was cooled under a purge of nitrogen gas. Each sample was then treated with 8 kilograms of iron pentacarbonyl per metric ton of sample for 30 minutes at a temperature of 145° C. in the case of the carnotite ore and at a temperature of 125° C. in the case of the cuprite ore. All of the samples were subjected to a wet magnetic separation process. The analyses of the products thus obtained are presented below in Table 14.

TABLE 14

| Mineral | Fe (CO)$_5$ Treatment | Product | Weight (%) | Grade (%) | Metal | Metal Distribution |
|---|---|---|---|---|---|---|
| Carnotite | Yes | Magnetic | 49.3 | 0.019 | U$_3$O$_8$ | 82.2 |
|  |  | Nonmagnetic | 50.7 | 0.004 | U$_3$O$_8$ | 17.8 |
|  |  | Calculated Feed | 100.0 | 0.011 | U$_3$O$_8$ | 100.0 |
| Carnotite | No | Magnetic | 1.9 | 0.140 | U$_3$O$_8$ | 21.3 |
|  |  | Nonmagnetic | 98.1 | 0.010 | U$_3$O$_8$ | 78.7 |
|  |  | Calculated Feed | 100.0 | 0.012 | U$_3$O$_8$ | 100.0 |
| Cuprite | Yes | Magnetic | 5.6 | 20.6 | Cu | 91.5 |
|  |  | Nonmagnetic | 94.4 | 0.114 | Cu | 8.5 |
|  |  | Calculated Feed | 100.0 | 1.26 | Cu | 100.0 |
| Cuprite | No | Magnetic | 1.6 | 42.9 | Cu | 59.7 |
|  |  | Nonmagnetic | 98.4 | 0.47 | Cu | 40.3 |
|  |  | Calculated Feed | 100.0 | 1.15 | Cu | 100.0 |

EXAMPLE 15

Samples of carnotite were made into 3% synthetic ores as indicated in Example 1. Each of these samples was subjected to a pretreatment and thereafter treated with eight kilograms of iron pentacarbonyl per metric ton of sample for thirty minutes at a temperature of 135° C. The pretreatments were carried out as described in Examples 5 and 7 with the exception of time and temperature variations. The temperature and time of the pretreatment are set forth in Table 15. For comparative purposes, samples were subjected just to the pretreatment, receiving no iron carbonyl treatment. Additionally, two samples received no pretreatment with one being subjected to the iron carbonyl treatment and the other merely being heated to a temperature of 145° C. All of the samples were subjected to a wet magnetic separation process. Analyses of the products thus obtained are presented below in Table 15.

TABLE 15

| Fe (CO)$_5$ Treatment (Pretreatment) | Pretreatment Temperature (°C.) | Time (minutes) | Product | Weight (%) | Grade (%) | U$_3$O$_8$ Distribution |
|---|---|---|---|---|---|---|
| Yes (Heat & H$_2$) | 150 | 15 | Magnetic | 22.7 | 0.024 | 58.5 |
|  |  |  | Nonmagnetic | 77.3 | 0.005 | 41.5 |
|  |  |  | Calculated Feed | 100.0 | 0.009 | 100.0 |
| No (Heat & H$_2$) | 150 | 15 | Magnetic | 0.92 | 0.033 | 3.0 |
|  |  |  | Nonmagnetic | 99.08 | 0.010 | 97.0 |
|  |  |  | Calculated Feed | 100.0 | 0.010 | 100.0 |
| Yes (Heat & H$_2$) | 150 | 90 | Magnetic | 11.1 | 0.033 | 37.0 |
|  |  |  | Nonmagnetic | 88.9 | 0.007 | 62.9 |
|  |  |  | Calculated Feed | 100.0 | 0.010 | 100.0 |
| No (Heat & H$_2$) | 150 | 90 | Magnetic | 0.73 | 0.061 | 3.1 |
|  |  |  | Nonmagnetic | 99.27 | 0.014 | 96.9 |
|  |  |  | Calculated Feed | 100.0 | 0.014 | 100.0 |
| Yes (Heat & CO) | 150 | 15 | Magnetic | 52.0 | 0.017 | 78.6 |
|  |  |  | Nonmagnetic | 48.0 | 0.005 | 21.4 |
|  |  |  | Calculated Feed | 100.0 | 0.011 | 100.0 |
| No (Heat & CO) | 150 | 15 | Magnetic | 0.78 | 0.226 | 15.1 |
|  |  |  | Nonmagnetic | 99.22 | 0.010 | 84.9 |
|  |  |  | Calculated Feed | 100.0 | 0.012 | 100.0 |
| Yes | none |  | Magnetic | 1.4 | 0.73 | 34.5 |
|  |  |  | Nonmagnetic | 98.6 | 0.019 | 65.5 |
|  |  |  | Calculated Feed | 100.0 | 0.029 | 100.0 |
| No (heated to 145° C.) | none |  | Magnetic | 0.67 | 0.297 | 6.7 |
|  |  |  | Nonmagnetic | 99.33 | 0.028 | 93.3 |
|  |  |  | Calculated Feed | 100.0 | 0.030 | 100.0 |

EXAMPLE 16

Chrysocolla was ground to a minus 65 mesh and mixed with minus 65 mesh silica sand to produce a 3% synthetic ore. A sample of this ore was pretreated with steam in the manner described in Example 1 and another sample was pretreated with heat and hydrogen sulfide gas in the manner described in Example 12. Both were then separately treated with 8 kilograms of iron pentacarbonyl per metric ton of ore for 30 minutes at a temperature of 160° C.

For comparative purposes, additional samples of the ore were subjected to only the steam and hydrogen sulfide pretreatments. Also, two sets of samples of the ore were given no pretreatment; one was subjected to only the iron pentacarbonyl treatment and the other sample was heated to 160° C.

All of the samples were subjected to a wet magnetic separation process. Anaylses of the products thus obtained are given below in Table 16.

TABLE 16

| Pretreatment | Product | Weight (%) | Grade (%) | Copper Distribution | Separation Amperage |
|---|---|---|---|---|---|
| None (Fe(DO)$_5$ at 160° C.) | Magnetic | 5.6 | 3.55 | 91.3 | 2.0 |
| | Nonmagnetic | 94.4 | 0.02 | 8.7 | |
| | Calculated Feed | 100.0 | 0.218 | 100.0 | |
| None (heated to 160° C.) | Magnetic | 1.44 | 6.86 | 50.1 | 2.0 |
| | Nonmagnetic | 98.56 | 0.10 | 49.9 | |
| | Calculated Feed | 100.0 | 0.197 | 100.0 | |
| Steam | Magnetic | 4.7 | 3.66 | 72.1 | 1.0 |
| | Nonmagnetic | 95.3 | 0.07 | 27.9 | |
| | Calculated Feed | 100.0 | 0.239 | 100.0 | |
| Steam blank | Magnetic | 0.6 | 5.91 | 17.3 | 1.0 |
| | Nonmagnetic | 99.4 | 0.17 | 82.7 | |
| | Calculated Feed | 100.0 | 0.204 | 100.0 | |
| H$_2$S | Magnetic | 21.0 | 0.41 | 40.5 | 1.0 |
| | Nonmagnetic | 79.0 | 0.16 | 59.5 | |
| | Calculated Feed | 100.0 | 0.213 | 100.0 | |
| H$_2$S blank | Magnetic | 0.41 | 1.58 | 2.9 | 1.0 |
| | Nonmagnetic | 99.59 | 0.22 | 97.1 | |
| | Calculated Feed | 100.0 | 0.226 | 100.0 | |
| None (Fe(CO)$_5$ at 160° C.) | Magnetic | 3.5 | 5.11 | 78.8 | 1.0 |
| | Nonmagnetic | 96.5 | 0.05 | 21.2 | |
| | Calculated Feed | 100.0 | 0.227 | 100.0 | |
| None (heated to 160° C.) | Magnetic | 1.0 | 5.29 | 22.9 | 1.0 |
| | Nonmagnetic | 99.0 | 0.18 | 77.1 | |
| | Calculated Feed | 100.0 | 0.231 | 100.0 | |

What is claimed is:

1. In a process for the beneficiation of a metal oxide ore wherein the ore is treated with a metal containing compound under conditions which cause the metal containing compound to react substantially at the surface of the metal oxide particles to the substantial exclusion of the gangue particles so as to alter the surface characteristics of the metal values thereby causing a selective enhancement of the magnetic susceptibility of one ore more metal oxide values of the ore to the exclusion of the gangue in order to permit a separation between the values and gangue, the improvement comprising:

treating the ore with heat prior to its treatment with the metal containing compound.

2. The process of claim 1 wherein the heat pretreatment is conducted at a temperature of at least about 80° C.

3. The process of claim 2 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane and other hydrocarbons in the gaseous state at the pretreatment temperature.

4. The process of claim 3 wherein the gas is employed in an amount of at least about 2 cubic meters per hour per metric ton of metal oxide ore being processed.

5. The process of claim 3 wherein the gas is steam at a temperature of at least about 100° C. and employed in an amount of from about 1% to 50 weight percent water, based on the weight of the metal oxide ore.

6. The process of claim 2 or claim 3 wherein the treatment of the ore with the metal containing compound is conducted at a temperature within a range of 125° C. less than the general decomposition temperature of the metal containing compound in a specific system for the ore being treated.

7. The process of claim 6 wherein the metal containing compound is employed in an amount of from about 0.1 to 100 kilograms per metric ton of ore.

8. In a process for the beneficiation of a metal oxide ore wherein the ore is treated with an iron carbonyl compound under conditions which cause the iron carbonyl compound to react substantially at the surface of the metal oxide particles to the substantial exclusion of the gangue particles so as to alter the surface characteristics of the metal values thereby causing a selective enhancement of the magnetic susceptibility of one or more metal oxide values of the ore to the exclusion of the gangue in order to permit a physical separation between the values and the gangue, the improvement comprising:

treating the ore with heat prior to its treatment with the iron carbonyl.

9. The process of claim 8 wherein the ore is pretreated to a temperature of at least about 80° C. for a time period of at least about 0.1 hours.

10. The process of claim 9 wherein the ore is pretreated to a temperature of from about 125° C. to about 450° C. for a time period of from about 0.20 to about 4 hours.

11. The process of claim 9 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane and other hydrocarbon compounds in the gaseous state at the pretreatment temperature.

12. The process of claim 9 wherein the metal oxide ore is selected from the group consisting of carnotite, apatite, scheelite, cuprite, cassiterite, bauxite and hematite.

13. In a process for the beneficiation of a metal oxide ore wherein the ore in a specific system is treated with from about 0.1 to about 100 kilograms of a metal containing compound per metric ton of ore at a temperature within a range of 125° C. less than the general decomposition temperature of the metal containing compound in a specific system for the ore being treated for a period of time from about 0.05 to about 4 hours to cause the metal containing compound to react substantially at the surface of the metal oxide particles to the substantial exclusion of the gangue particles so as to alter the surface characteristics of the metal values thereby causing a selective enchancement of the magnetic susceptibility of one ore more metal oxide values contained in the ore to the exclusion of the gangue in order to permit a physical separation, the improvement comprising:

heat treatment of the ore prior to treating it with the metal containing compound.

14. The process of claim 1 or claim 13 wherein the metal containing compound is an iron containing compound.

15. The process of claim 14 wherein the iron containing compound is selected from the group consisting of ferrous chloride, ferric chloride, ferrocene, ferrocene derivatives, ferric acetylacetonate, and ferric acetylacetonate derivatives.

16. The process of claim 1 or claim 13 wherein the metal containing compound is a carbonyl.

17. The process of claim 16 wherein the carbonyl is selected from the group consisting of iron, cobalt, and nickel.

18. The process of claim 17 wherein the carbonyl comprises an iron carbonyl.

19. The process of claim 13 or claim 15 wherein the ore is pretreated to a temperature of at least about 80° C. for a time period of at least about 0.1 hours.

20. The process of claim 19 wherein the ore is pretreated to a temperature of from about 125° C. to about 450° C. for a time period of from about 0.20 to about 4 hours.

21. The process of claim 19 wherein the heat pretreatment is conducted in the presence of a gas selected from the group consisting of steam, nitrogen, hydrogen, carbon monoxide, carbon dioxide, ammonia, hydrogen sulfide, sulfur dioxide, methane, air, ethane, propane, butane and other hydrocarbon compounds in the gaseous state at the pretreatment temperature.

22. The process of claim 21 wherein the gas is employed in an amount of at least about 12 cubic meters per hour per metric ton of ore being processed.

23. The process of claim 20 wherein the metal containing compound is an iron carbonyl and the treatment of the ore with the iron carbonyl is carried out at a temperature within a range 15° C. less than the general decomposition temperature of the iron carbonyl in the specific system for the ore being treated.

24. The process of claim 23 wherein the heat pretreatment is conducted in the presence of a gas selected from the group consisting of steam, nitrogen and carbon monoxide.

25. The process of claim 24 wherein the ore is carnotite.

26. The process of claim 24 wherein the ore is apatite.

27. The process of claim 24 wherein the ore is scheelite.

28. The process of claim 24 wherein the ore is cuprite.

29. The process of claim 24 wherein the ore is cassiterite.

30. The process of claim 23 wherein the heat pretreatment is conducted in the presence of a gas selected from the group consisting of hydrogen, hydrogen sulfide, sulfur dioxide and ammonia.

31. The process of claim 30 wherein the ore is carnotite.

32. The process of claim 30 wherein the ore is cuprite.

33. In a process for the beneficiation of a metal oxide ore selected from the group consisting of carnotite, apatite, scheelite, cuprite, cassiterite, bauxite, and hematite wherein the ore in a specific system is treated with from about 2 to about 20 kilograms of an iron containing compound per metric ton of ore at a temperature within a range of 125° C. less than the general decomposition temperature of the iron containing compound in a specific system for the ore being treated to cause the iron containing compound to react substantially at the surface of the metal oxide particles to the substantial exclusion of the gangue particles so as to alter the surface characteristics of the metal values thereby causing a selective enhancement of the magnetic susceptibility of one ore more metal oxide values contained in the ore to the exclusion of the gangue in orddr to permit their magnetic separation, the improvement comprising:

heating the ore to a temperature of from about 125° C. to about 500° C. for a time period of from about 0.25 to about 1 hour prior to its treatment with the iron containing compound.

34. The process of claim 33 wherein the ore is selected from the group consisting of apatite and bauxite.

35. The process of claim 34 wherein the iron containing compound is ferrocene and the heat pretreatment is conducted in the presence of a gas selected from the group consisting of steam and nitrogen.

36. The process of claim 33 wherein the ore is selected from the group consisting of carnotite, apatite and bauxite, the iron containing compound is ferrocene and the heat pretreatment is conducted in the presence of a gas selected from the group consisting of hydrogen and carbon monoxide.

37. The process of claim 33 wherein the ore is selected from the group consisting of shceelite, hematite and bauxite and the iron containing compound is ferric acetylacetonate.

38. The process of claim 33 wherein the ore is selected from the group consisting of carnotite, scheelite, hematite and bauxite, the iron containing compound is ferric acetylacetonate and the heat pretreatment is conducted in the presence of steam.

39. The process of claim 33 wherein the ore is selected from the group consisting of carnotite, apatite and hematite, the iron containing compound is ferric acetylacetonate and the heat pretreatment is conducted in the presence of hydrogen.

40. The process of claim 33 wherein the ore is selected from the group consisting of carnotite, scheelite and apatite, the iron containing compound is ferric acetylacetonate and the heat pretreatment is conducted in the presence of carbon monoxide.

41. In a process for the beneficiation of a metal oxide ore wherein the ore for the specific system is treated with from about 0.1 to about 100 kilograms of an iron containing compound selected from the group consisting of ferrous chloride, ferric chloride, ferrocene, ferrocene derivatives, ferric acetylacetonate and ferric acetylacetonate derivatives per metric ton of ore at a temperature within a range of 125° C. less than the general decomposition temperature of the metal containing compound in a specific system for the ore being treated for a period of time from about 0.05 to about 4 hours to cause the iron containing compound to react substantially at the surface of the metal oxide particles to the substantial exclusion of the gangue particles so as to alter the surface characteristics of the metal values thereby causing a selective enhancement of the magnetic susceptibility of one or more metal oxide values contained in the ore to the exclusion of the gangue in order to permit a physical separation between the values and gangue, the improvement comprising:

heat treatment of the ore prior to treating it with the iron containing compound.

* * * * *

UNITED STATES PATENT AND TRADEMARK OFFICE
CERTIFICATE OF CORRECTION

PATENT NO. : 4,205,979
DATED : June 3, 1980
INVENTOR(S) : Kindig, et al.

It is certified that error appears in the above—identified patent and that said Letters Patent is hereby corrected as shown below:

Column 1, line 62, delete "or" insert --ore--.

Column 2, line 32, delete "vaporizaton" insert --vaporization--.

Column 3, line 37, delete "surfacr characterisics" insert --surface characteristics--.

Column 3, line 53, delete "chrysocollar" insert --chrysocolla--.

Column 4, line 61, delete "sulfides" insert --oxides--.

Column 24, line 30, delete "shceelite," insert --scheelite,--

Signed and Sealed this

Nineteenth Day of May 1981

[SEAL]

Attest:

RENE D. TEGTMEYER

Attesting Officer

Acting Commissioner of Patents and Trademar